United States Patent [19]

Oosterkamp

[11] Patent Number: 5,145,638
[45] Date of Patent: Sep. 8, 1992

[54] RPV HOUSED ATWS POISON TANK

[75] Inventor: Willem J. Oosterkamp, Los Gatos, Calif.

[73] Assignee: General Electric Company, San Jose, Calif.

[21] Appl. No.: 634,277

[22] Filed: Dec. 20, 1990

[51] Int. Cl.$^5$ .............................................. G21C 7/22
[52] U.S. Cl. .................................... 376/282; 376/328
[58] Field of Search ............................. 376/282, 328; 976/DIG. 130

[56] References Cited

U.S. PATENT DOCUMENTS

| | | | |
|---|---|---|---|
| 3,414,476 | 12/1968 | Galli de Paratesi et al. | 376/328 |
| 4,897,240 | 1/1990 | Sako | 376/328 |
| 5,000,907 | 3/1991 | Chevereau et al. | 376/282 |
| 5,011,652 | 4/1991 | Tominaga et al. | 376/282 |

Primary Examiner—Daniel D. Wasil
Attorney, Agent, or Firm—Robert R. Schroeder

[57] ABSTRACT

The present invention is directed to a boiling water reactor wherein housed within the reactor pressure vessel is the nuclear core and an upper steam dome connected to a steam outlet in the RPV. The improvement comprises a vessel disposed in the steam dome and containing a neutron poison effective for inactivating the core. This vessel is vented to the steam dome for pressurizng the poison contained therein. The vessel also is connected by a line terminating beneath the core. The line contains an actuatable valve to release the poison through the line upon its actuation. The poison, when released, flows through the line by gravity to beneath the core for mixing with the reactor coolant which passes through the core resulting in consequent inactivation thereof.

6 Claims, 1 Drawing Sheet

RPV HOUSED ATWS POISON TANK

BACKGROUND OF THE INVENTION

The present invention relates to nuclear boiling water reactors (BWRs) and more particularly to incorporation of the ATWS (anticipated transients without scram) neutron poison tank into the reactor pressure vessel (RPV).

The stand-by liquid control system is a redundant control system capable of shutting a BWR down from rated power operation to a cold condition in the postulated situation that the control rods cannot be inserted. No operating BWR has required the use of a stand-by liquid control system, though safety considerations dictate that such equipment be available.

The equipment for the stand-by liquid control system is located in the reactor building outside of the drywell and typically consists of a stainless steel storage tank, a pair of full capacity positive displacement pumps and injection valves, a test tank, and the necessary piping, valves, and instrumentation. A detection system of an ATWS also is provided. In terms of signals, the ATWS event is defined as too high a pressure and too high a neutron flux persisting longer than a specified time, or too low of a water level and too high a neutron flux persisting for a defined time.

The stand-by liquid control system is adequate to bring the reactor from a hot operating condition to cold shut-down and to hold the reactor shut-down with an adequate margin when considering temperature, voids, Doppler effect, equilibrium xenon, and shut-down margin. It is assumed that the core is operating at normal xenon level when injection of liquid control chemical is needed.

The liquid control chemical used in boron, typically in the form of sodium pentaborate solution. It can be injected into the bottom of the core where it mixes with the reactor coolant. In present designs, electric heaters automatically keep the solution above the saturation temperature. The system temperature and liquid level in the storage tank are monitored and abnormal conditions are enunciated in the control room.

Making such system passive poses some problems. Present configurations utilize an accumulator at a higher pressure than the postulated maximum reactor pressure. There are a number of disadvantages to this configuration. The neutron poison tank is a high pressure one and associated piping in the containment present costs which are non-negligible. Additionally, space has to be provided in the wetwell to accommodate the nitrogen that is used to pressurize the accumulator tank.

BROAD STATEMENT OF THE INVENTION

The present invention is directed to a boiling water reactor wherein housed within the reactor pressure vessel is the nuclear core and an upper steam dome connected to a steam outlet in the RPV. The improvement comprises a vessel disposed in the steam dome and containing a neutron poison effective for inactivating the core. This vessel is vented to the steam dome for pressurizing the poison contained therein. The vessel also is connected by a line terminating beneath the core. The line contains an actuable value to release the poison through the line upon its actuation. The poison, when released, flows through the line by gravity to beneath the core for mixing with the reactor coolant which passes through the core resulting in consequent inactivation thereof.

Advantages of the present invention include the elimination of a high pressure system within the containment that presently is used for stand-by liquid control systems. Another advantage is the elimination of a fluid break below the top of the core. Another advantage is a stand-by liquid control system design that assures functioning of the system at extreme high pressures. These and other advantages will be readily apparent to those skilled in the art based upon the disclosure contained herein.

Figure 1:
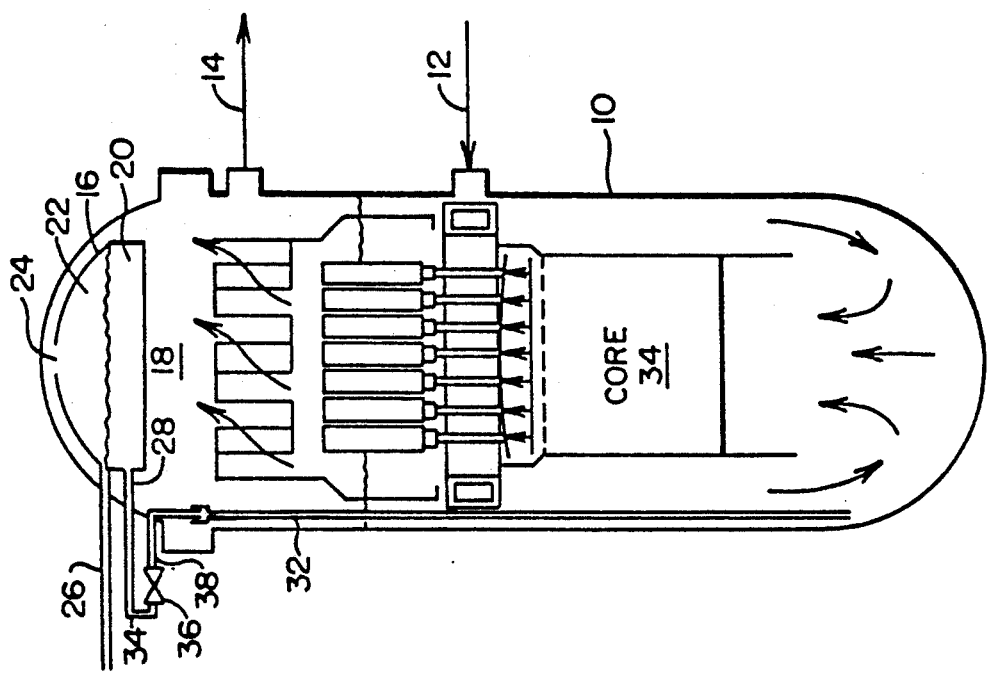
FIG. 1 is a simplified cross-sectional elevational view of a BWR schematically presenting a configuration of the inventive stand-by liquid control system of the present invention with an internal valve.

The drawings will be described in detail below.

DETAILED DESCRIPTION OF THE INVENTION

Referring to the drawings, reactor pressure vessel (RPV) 10 is seen to admit feedwater via inlet 12 and exhaust steam via outlet 14. The remaining elements of RPV 10 are not all set forth or labelled in the drawings and will not be described in detail here as they are familiar to those skilled in the art.

Of importance for purposes of the present invention is the provision of a stand-by liquid control system involving the incorporation of the ATWS neutron poison tank within RPV 10. Neutron poison tank 16 is seen to be located within upper steam dome 18 of RPV 10. It is from upper steam dome 18 that steam is exhuasted via outlet 14. Tank 16 contains aqueous liquid poison 20 which occupies only a fraction of tank 16. Sufficient head space 22 is provided for expansion of liquid neutron poison 20 due to temperature variations experienced within steam dome 18. Tank 16 additionally contains vent 24 that permits head space 22 to be pressurized to the same pressure as exhibited within steam dome 18. Thus, ATWS neutron poison 20 housed within tank 16 is heated and pressurized efficiently and effectively by the temperature and pressure provided within steam dome 18.

Figure 2:
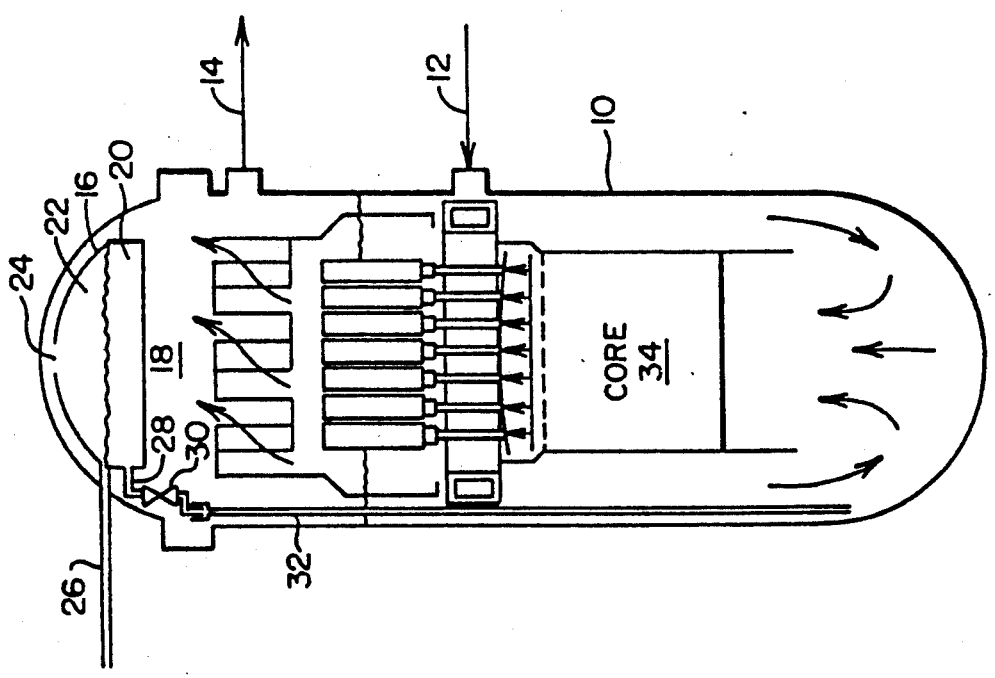
FIG. 2 is like FIG. 1, except that the valve is external.

The activity of neutron poison 20 housed within tank 16 can be assayed by use of line 26 which runs to analytical units, not shown in the drawing. It will be appreciated that line 26 can penetrate RPV 10 at a different location, but conveniently is shown penetrating RPV 10 through the upper portion of the RPV. The contents of tank 16 can be withdrawn via line 28 when valve 20 is actuated, by means now shown in the drawing but which can be provided in conventional fashion. Two alternative routes of flow of neutron poison 20 are illustrated in the drawings. Initially referring to FIG. 1, line 32 on the lower side of valve 30 terminates below core 34 wherein the neutron poison mixes with the reactor coolant water which then flows through core 34 with consequent inactivation of the core. It will be observed that gravity and the pressure within upper steam dome 18 causes neutron poison 20 to flow through lines 28 and 32. Alternatively with reference to FIG. 2, safety and regulatory mandate may require that the neutron poison flow via line 34 through valve 36 and thence through line 38 into line 32. Such configuration would permit external control and inspection capability of valve 36 by the operator due to its being located outside of RPV 10. It will be appreciated that additional piping and instrumentation configurations can be envisioned in accordance with the precepts of the present invention. Regardless of such configuration, the present invention exhibits numerous advantages detailed herein by locating the stand-by liquid control system within the RPV and taking advantage of such location.

As to materials of construction, preferably all components are manufactured from materials appropriate for their use within a nuclear BWR. Further, it will be appreciated that various of the components shown and described herein may b altered or varied in accordance with conventional wisdom in the field and certainly are included within the present invention, provided that such variations do not materially vary within the scope and precepts of the present invention as described herein.

I claim:

1. In a boiling water reactor (BWR) wherein housed within a reactor pressure vessel (RPV) is a nuclear core and an upper steam dome connected to a steam outlet in said RPV, the improvement which comprises:

a pressurized vessel disposed in said steam dome containing a neutron poison effective for inactivating said core and a first line for assaying said poison which first line runs to the outside of said RPV, said vessel being vented to said steam dome to pressurize said poison contained therein, said vessel being connected by a second line terminating beneath said core, said second line containing a valve which is actuatable to release the poison through said line upon its actuation.

2. The BWR of claim 1 wherein said second line to beneath said core passes outside said RPV between said vessel and the termination of said line.

3. The BWR of claim 2 wherein said actuable valve is located outside said RPV.

4. A method for providing a stand-by liquid control system for a boiling water reactor (BWR) wherein housed within a reactor pressure vessel (RPV) is a nuclear core and an upper steam dome connected to a steam outlet in said RPV, which comprises disposing in said steam dome a pressurized vessel containing a neutron poison effective for inactivating said core and a first line for assaying said poison which first line runs to the outside of said RPV, venting said vessel to said steam dome to pressurize said poison contained therein, and connecting said vessel by a second line to beneath said core wherein said second line terminates, said second line containing a valve which is actuatable to release the poison through said line upon its actuation.

5. The method of claim 4 wherein said second line to beneath said core passes outside said RPV between said vessel and its termination.

6. The BWR of claim 5 wherein said actuable valve is located outside said RPV.

* * * * *